(12) United States Patent  
Scarbrough et al.

(10) Patent No.: US 9,174,787 B2  
(45) Date of Patent: Nov. 3, 2015

(54) INFLATABLE, REUSABLE AND LEAK-RESISTANT CARRIER

(71) Applicants: Elizabeth Scarbrough, Ventura, CA (US); Wendell Liljedahl, Ventura, CA (US)

(72) Inventors: Elizabeth Scarbrough, Ventura, CA (US); Wendell Liljedahl, Ventura, CA (US)

( * ) Notice: Subject to any disclaimer, the term of this patent is extended or adjusted under 35 U.S.C. 154(b) by 0 days.

(21) Appl. No.: 14/260,166

(22) Filed: Apr. 23, 2014

(65) Prior Publication Data

US 2014/0224700 A1      Aug. 14, 2014

Related U.S. Application Data

(63) Continuation of application No. 13/255,926, filed as application No. PCT/US2010/027125 on Mar. 12, 2010, now abandoned.

(60) Provisional application No. 61/210,033, filed on Mar. 13, 2009.

(51) Int. Cl.
   *B65D 81/02*      (2006.01)
   *A45C 7/00*       (2006.01)
   *B65D 81/05*      (2006.01)

(52) U.S. Cl.
   CPC .............. *B65D 81/02* (2013.01); *A45C 7/0081* (2013.01); *B65D 81/052* (2013.01); *Y02W 30/807* (2015.05)

(58) Field of Classification Search
   CPC ............................ B65D 81/052; B65D 81/03
   USPC ........................ 206/522, 521, 433; 383/3, 59
   See application file for complete search history.

(56) References Cited

U.S. PATENT DOCUMENTS

| | | | | |
|---|---|---|---|---|
| 4,155,453 A * | 5/1979 | Ono | ............................ | 206/522 |
| 4,465,188 A * | 8/1984 | Soroka et al. | ................. | 206/522 |
| 4,872,558 A * | 10/1989 | Pharo | ............................ | 206/522 |
| 4,918,904 A * | 4/1990 | Pharo | ............................ | 53/472 |
| 5,316,386 A * | 5/1994 | Moore | ............................ | 383/10 |
| 5,833,053 A * | 11/1998 | Wood et al. | ....................... | 206/5 |
| 6,176,613 B1 * | 1/2001 | Chen | ................................ | 383/3 |
| 2005/0061409 A1 * | 3/2005 | Chung | ............................ | 150/110 |
| 2008/0035519 A1 * | 2/2008 | Swartz et al. | ................. | 206/522 |
| 2008/0298724 A1 * | 12/2008 | Liao et al. | ........................ | 383/3 |
| 2009/0169134 A1 * | 7/2009 | Hsu | .................................. | 383/3 |

* cited by examiner

*Primary Examiner* — Jacob K Ackun
*Assistant Examiner* — Jenine Pagan
(74) *Attorney, Agent, or Firm* — Bruce E. Weir

(57) ABSTRACT

A protective carrier (10) for portable objects has an interior layer (30) and an exterior layer (20) welded together to form a compartment (2) that is surrounded by inflatable air chambers (3). The compartment (2) has an opening in one end (62) through which objects are inserted. The open end (62) may be closed with a fluid-resistant seal (65) that rolls and is secured by buckles (40, 70), making the compartment (2) leak-resistant. The air chambers (3) may be inflated and deflated through a valve (100).

1 Claim, 4 Drawing Sheets

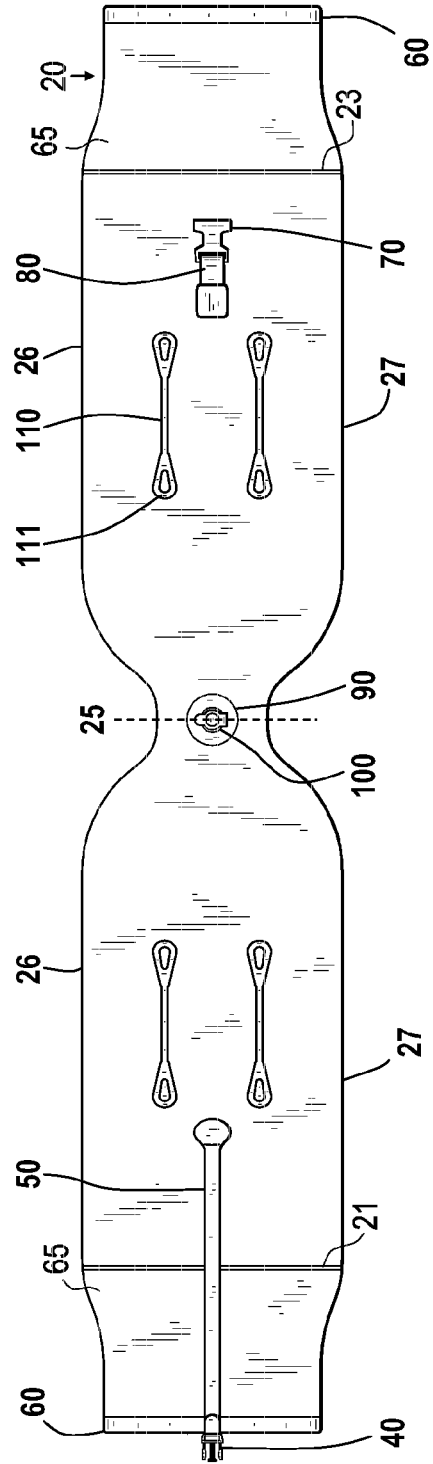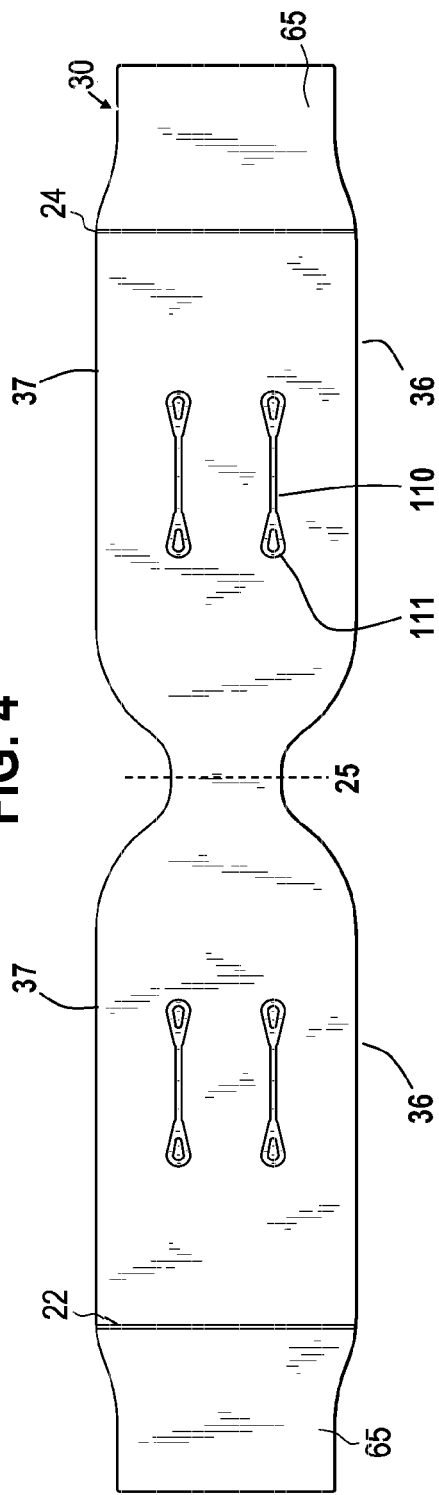

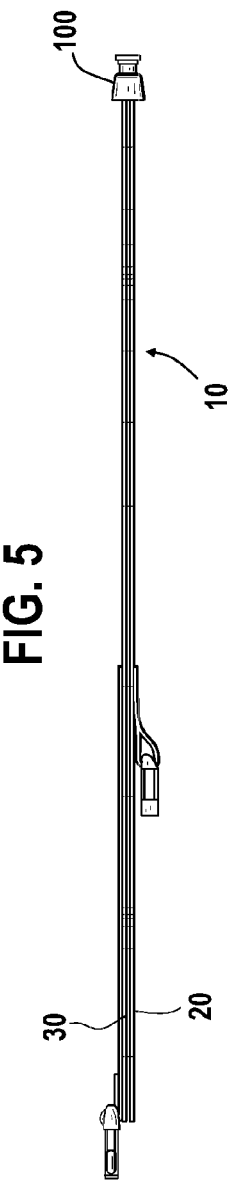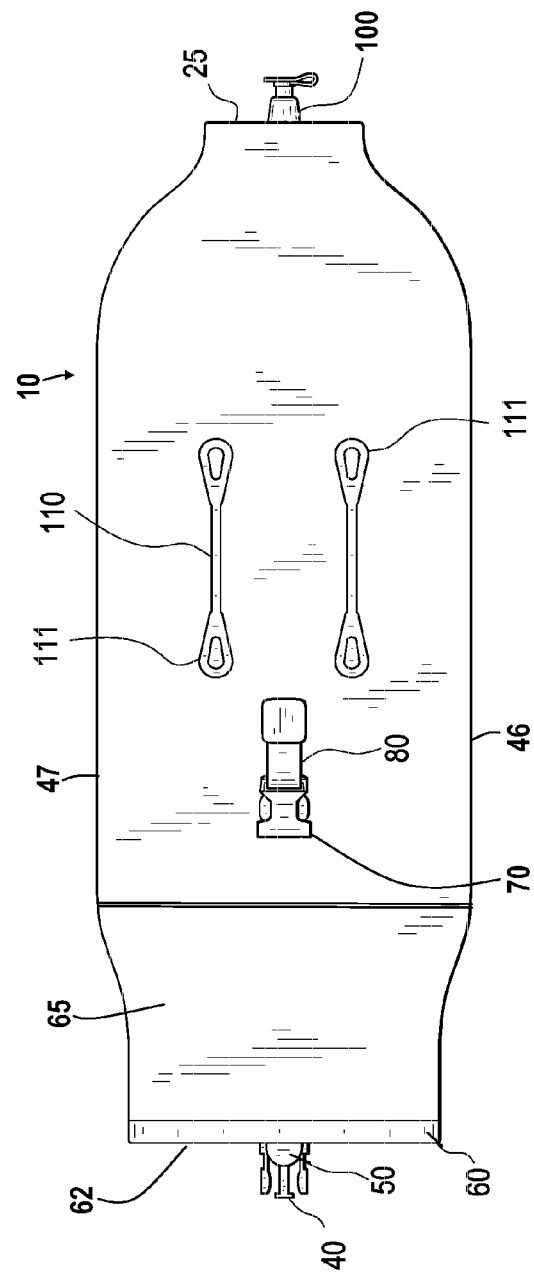

INFLATABLE, REUSABLE AND LEAK-RESISTANT CARRIER

CROSS-REFERENCE TO RELATED APPLICATIONS

This application is a continuation of U.S. utility patent application Ser. No. 13/255,926, filed by the same inventors on Sep. 12, 2011, which is a 371 of international application PCT/US2010/027125, filed by the same inventors on Mar. 12, 2010, now expired, which claimed the benefit of U.S. provisional patent application Ser. No. 61/210,033, filed by the same inventors on Mar. 13, 2009, now expired.

BACKGROUND

Embodiments disclosed herein generally relate to inflatable, reusable and leak-resistant carriers for transporting, shipping and storing liquid-containing articles and/or breakable articles.

In 2006 the Transportation Security Administration (TSA) imposed a 3-ounce restriction for liquids in carry-on airline luggage. This TSA restriction has highlighted the need for a reliable means of transporting bottled liquids in checked luggage. While there are many products and technologies available to protect items against breakage and leakage during commercial transport, they are not practical for consumer use due to size, expense, complexity and/or special equipment requirements.

Currently, passengers traveling with wine, alcohol, perfumes and other liquids must pack them in checked luggage or relinquish them to TSA authorities prior to boarding an aircraft. For passengers unaware or uninformed of the TSA rule, disappointing and costly losses are incurred. According to officials in Florida, the TSA stopped a daily average of about 150 bottles of liquor from being carried onto flights departing from South Florida's three major airports in 2007. This amounts to roughly $2.4 million annually in wasted consumer dollars in Florida alone.

Informed travelers who know of the restrictions are theoretically able to prevent the loss of their liquid articles to authorities by packing them in checked luggage. However, lack of acceptable carriers to transport these items has resulted in reduced purchases made while traveling, and significant risk of breakage, leakage and damage to surrounding articles for those who transport liquids with inadequate protection. For example, a passenger shopping in Italy may refrain from purchasing prized bottles of olive oil or wine for fear that hand-carrying the bottles would result in their confiscation by authorities, and packing the bottles in a suitcase could result in leakage or damage to clothing. It is well known that airlines have begun to require Styrofoam boxes for wine packed in suitcases due to the frequency of broken bottles. However, these Styrofoam containers cannot assure the integrity of bottled liquids, must be opened for inspection, and cannot contain liquids in the event a bottle breaks, cracks or leaks. A carrier that is safe against leaks would eliminate these problems.

Even in the absence of air travel restrictions, a convenient method of protecting liquids and breakables is still needed. Bottled liquids are often cumbersome and heavy, making them difficult to hand-carry, especially if there are multiple units. Consumers often transport liquids and/or breakable items by car, rail, boat, and other means. Bottled liquids are carried during sports activities including skiing, camping, fishing, hiking, and biking Accordingly, improved convenient leak-resistant carriers are needed.

SUMMARY

We provide a reusable, leak-resistant carrier to transport articles. The carrier includes an exterior layer and an interior layer that may be made of dissimilar materials. The exterior layer and interior layer may be welded together. In certain embodiments, the exterior and interior layers are RF welded. In certain embodiments, the exterior layer is polished PVC and the interior layer is frosted PVC. The welded exterior and interior layers may be attached by vertical stability bar welds. In certain embodiments, the welded exterior and interior layers may be attached with two vertical stability bar welds. In other embodiments, the welded exterior and interior layers may be attached by four vertical stability bar welds. Each end of a bar weld is tear-drop-shaped to distribute the stress from inflation air pressure.

Welded exterior and interior layers are folded over and longitudinal seams of the folded exterior and interior layers are joined to create air chambers with unobstructed air flow between air chambers. An air valve may be used to inflate or deflate the air chambers. The air chambers surround a compartment for carrying protected objects. When the air chambers are deflated, use of dissimilar materials to construct the exterior and interior layer prevents the sides of the air chambers adhering together. A deflated carrier may be laid flat or rolled for convenient transport with minimal space requirements.

The compartment has an open end through which one or more articles may be inserted and a fluid-resistant dry seal to close the open end. The dry seal is rolled and secured with a strap and buckle to create fluid-resistant barrier. In certain embodiments the dry seal is tapered to further prevent leaks.

Once articles are inserted into the compartment the carrier is inflated, typically by mouth or with a hand pump. In certain embodiments the dry seal is then closed and secured with a strap and buckle or clamping mechanism. Articles may be transported in the carrier by airliner, ship, automobile, bicycle, motorcycle, rail, on foot or other suitable means without fear of breakage or leakage.

BRIEF DESCRIPTION OF THE DRAWINGS

FIG. 3 is a top plan view of the exterior layer of a carrier prior to assembly.

FIG. 4 is a bottom plan view of the interior layer of a carrier prior to assembly.

FIG. 5 is a side elevation view of the carrier of FIG. 1 deflated and flattened.

FIG. 6 is a top plan view an assembled carrier prior to inflation.

The same reference numerals refer to the same elements throughout the various figures.

DETAILED DESCRIPTION

Figure 1:
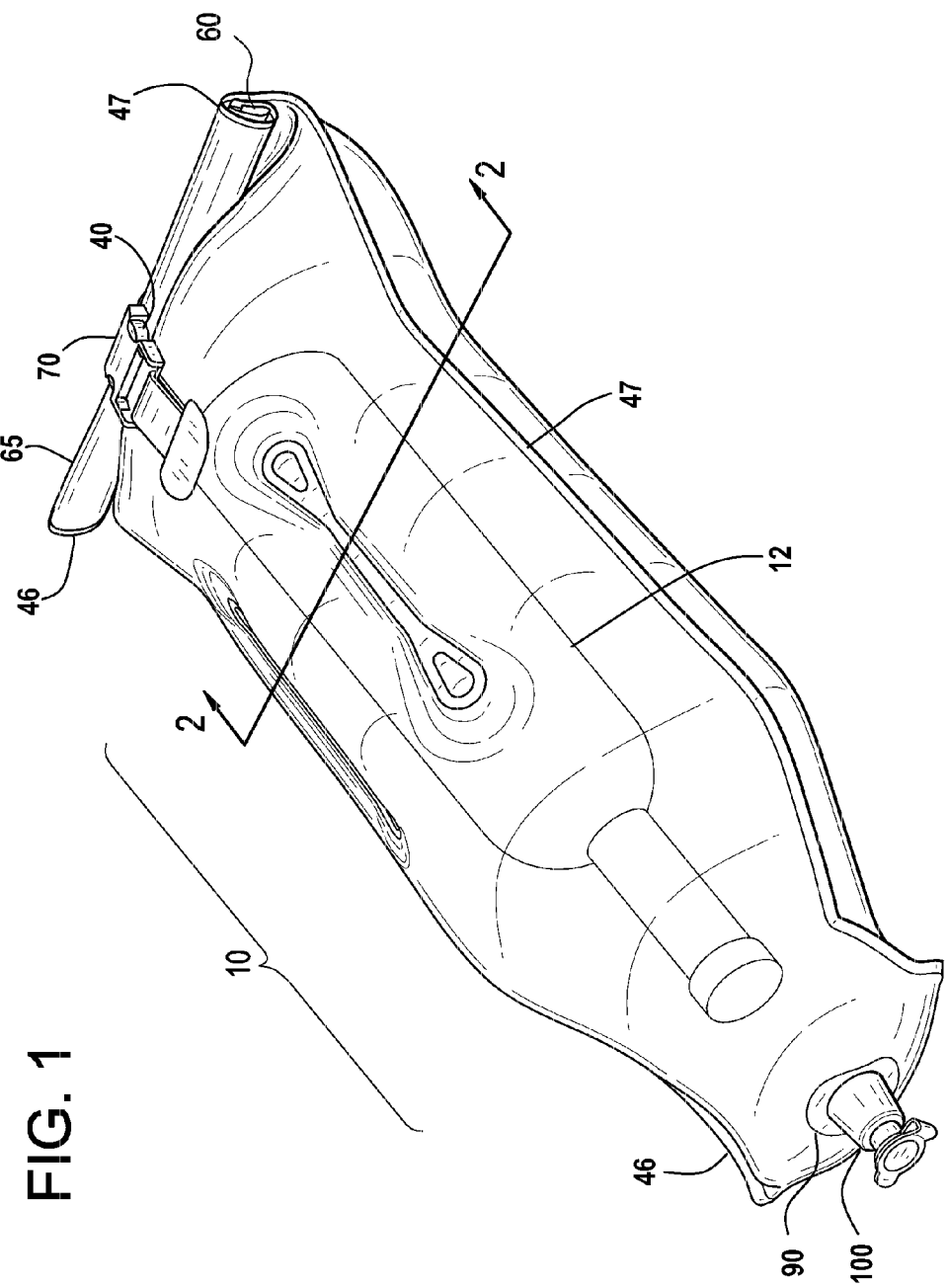
FIG. 1 is a perspective view of an inflated carrier containing a bottle.

FIG. 1 illustrates an embodiment of an inflatable, reusable, leak-resistant carrier 10 adapted to receive, hold and protect one or more containers or other articles. The carrier 10 may be used by persons travelling via air, on water, on land or on foot to transport one or more fragile items including but not limited to containers such as bottles containing liquids or other materials. The carrier 10 of FIG. 1 is shown containing a bottle 12. The carrier 10 may be constructed of transparent materials such that the articles within the carrier 10 may be visually inspected without removal.

The carrier 10 is resealable and reusable and may be laid flat, folded or rolled when not in use. FIG. 5 shows side elevation view of the carrier of FIG. 1 deflated and flattened. In certain embodiments the carrier 10 is constructed of fully or partially recyclable materials. The carrier 10 is designed to withstand mechanical stress and changes in pressure and temperature that are generally encountered during transport. Preferred embodiments of the carrier 10 are leak-resistant and can isolate and conform to one or more articles.

Figure 2:
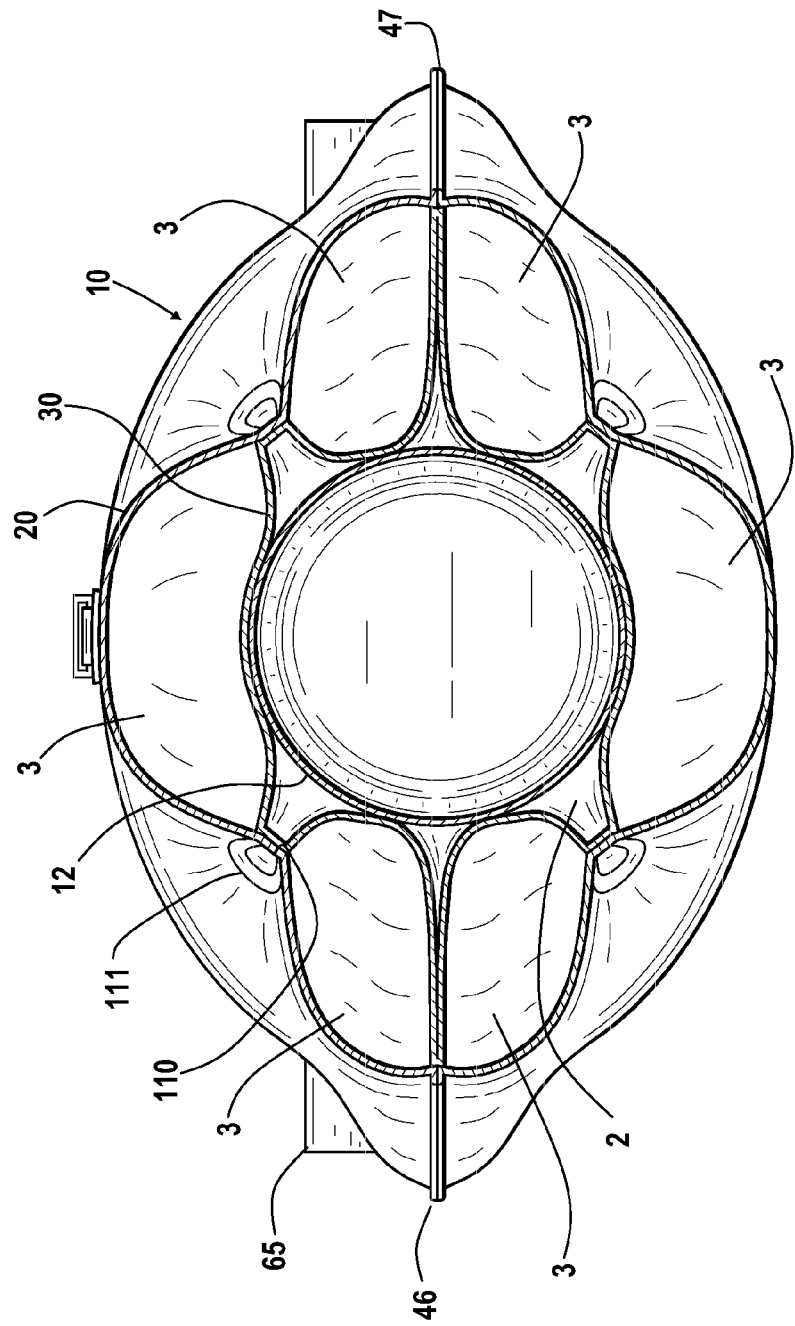
FIG. 2 is a cross-sectional view of the carrier of FIG. 1.

FIG. 2 shows a cross-sectional view of the carrier of FIG. 1. The carrier 10 comprises an interior layer 30 and an exterior layer 20. In this embodiment the interior layer and exterior layer are made of dissimilar materials. For example, the interior layer 30 can be made of frosted polyvinylchloride (PVC) and the exterior layer 20 can be made of polished PVC. Other materials that may be used for the layers include but are not limited to urethane, vinyl and other thermoplastics. Use of dissimilar materials for the interior and exterior layers prevents adherence between layers when the carrier 10 is not inflated, laid flat, folded or rolled and eases insertion of articles. In certain embodiments similar materials may be used provided they do not create adherence between layers.

FIG. 3 shows a top plan view of the exterior layer 20. FIG. 4 shows a bottom plan view of the interior layer 30. During assembly the valve 100, strap 50 and buckles (40, 70) are attached to exterior layer 20. The bottom surface (not shown) of the exterior layer 20 is placed against the top surface (not shown) of the interior layer 30. A first exterior layer edge 26 is aligned with a first interior layer edge 36 and a second exterior layer edge 27 is aligned with a second interior layer edge 37. In embodiments made of thermoplastics the interior layer 30 and the exterior layer 20 are then partially welded together so that a first exterior layer seam 21 is welded to a first interior layer seam 22 and a second exterior layer seam 23 is welded to a second interior layer seam 24.

Once these seams are welded together, vertical stability bar welds 110 join the exterior and interior layers to create patterned, volume-controlled air chambers 3 that position articles within the carrier. Tear-drop-shaped welds 111 at each end of each vertical stability bar weld 110 distribute loads and accommodate air pressure extremes. Although the number and position of vertical stability bar welds may vary in different embodiments, the four-bar weld pattern shown in FIGS. 2, 3, and 4 prevents both ballooning that occurs in the absence of any vertical stability bar welds and the quilting effect that may occur in small carriers when more than four vertical stability bar welds are used. For example, spot-welds create a pillowing effect that increases the external volume of the carrier without providing added protection.

A carrier 10 with a smaller external volume may be easily transported by the consumer without utilizing valuable space when traveling. The vertical stability bar welds 110 shown in FIGS. 2, 3, and 4 are sized to optimize the inflatable air chambers 3 surrounding the compartment 2 of carrier 10, balancing the tradeoff between cushioning and external volume. The number, size and positioning of bar welds 110 form air chambers 3 that allow the interior layer 30 to conform to the contents of the inflatable compartment 2, providing added protection, accommodating larger articles, and holding the articles firmly in place.

Once the interior 30 and exterior 20 layers are welded together at the interior and exterior seams 21, 22, 23, 24 and the vertical stability bar welds 110 with tear-drop-shaped welds 111 are added, the exterior and interior layers are folded across the valve 100 to create a valve end 25 as shown in FIG. 6.

After folding, the first exterior layer edge 26 is welded to the first interior layer edge 36 to create a first edge seam 46. The second exterior layer edge 27 is welded to the second interior layer edge 37 to create a second edge seam 47. The first and second edge seams 46, 47 form the welded edges of the compartment 2, the air chambers 3, and a rollable dry seal 65 of the carrier 10 shown in FIGS. 2 and 6. The sealed air chambers 3 then communicate with the atmosphere only through the valve 100, allowing a user to inflate or deflate all air chambers 3 simultaneously. The unobstructed air pathway created by the fold at the valve end 25 allows even inflation on all sides of the article or articles to be placed within the compartment 2 without the use of multiple air valves.

The valve 100 may be any known device for filling the air chambers 3 with gas such as air. The valve 100 should be leak-resistant and located to allow easy inflation of the air chambers 3. The valve 100 and washer 90 shown in FIGS. 1 and 3 are of a well-known, two-layer construction that can also accept an inflation tube. The valve 100 of the embodiment of FIG. 1 contains a flap to prevent unwanted escape of air. In other embodiments the valve 100 may be a push-pull valve. The carrier 10 may be inflated via the valve 100 orally or with the aid of a portable hand pump.

Referring to FIG. 6, the insertion end 62 of the carrier 10 remains unwelded to allow insertion of an article or articles into the compartment 2. Portions of exterior layer 20 and interior layer 30 form a four-ply dry seal 65. In the embodiment of FIG. 6 stiffeners 60 attached to both sides of the insertion end 62 of the dry seal 65 provide a firm, continuous contact surface across the width of the dry seal 65 to ensure a leak-resistant seal when the dry seal 65 is closed. Key elements in an effective dry seal 65 may include, but are not limited to, material thickness, material stiffness, a material's affinity for itself, a stiffener 60 to facilitate initiation of a tight roll and assure surface contact, degree of taper, length of extension and weld seam distortion.

After inflation of the carrier 10, the compartment 2 is sealed by flattening the insertion end 62 of the carrier 10 between the edge seams 46, 47 and pressing the flattened sides of the insertion end 62 together to form a continuous contact surface between edge seams 46, 47. The insertion end 62 is then tightly and evenly rolled to the base of the compartment 2 in proximity to the interior and exterior seams 21, 22, 23 and 24. The roll is then secured with a strap 50 adjustably attached to a first portion of a strap buckle 40 that engages a second portion of the strap buckle 70 as shown in FIG. 1. Although the embodiment of FIG. 1 shows a side release buckle, many other known buckles are acceptable. The second portion of the strap buckle 70 of FIG. 1 is attached to the carrier 10 by a loop 80 of strap material attached to the carrier 10. When fastened to the carrier 10 by a strap and buckle means the rollable dry seal 65 creates a leak-resistant closure for the compartment 2. The profile of the dry seal 65 is tapered to force any liquid present in the dry seal extension toward the center of the dry seal cavity, avoiding leakage at the edges.

Since the inner surfaces of the insertion end 62 are both made of the same interior layer 30 material, the combination of a stiffener 60 and the interior layer 30 material's affinity for itself provide a barrier against fluid transfer. The integrity of the fluid barrier is further enhanced by the diminishing internal space created by the taper of the dry seal 65 and the pressure created by the roll, restricting the fluid pathway. Accordingly, the carrier 10 is rendered leak-resistant. The material properties and durability of the carrier 10 coupled with the user's ability to repeatedly open and reseal the rollable dry seal 65 and inflate and deflate the air chambers 3 make the carrier 10 reusable.

In many embodiments all of the seams and seals in the carrier 10 including the welded seams, the dry seal and the stiffeners are sealed using Radio Frequency (RF) welding. RF welding is also referred to as Dielectric or High Frequency (HF) welding. PVC and polyurethanes are the most common thermoplastics to be welded by the RF process. It is possible to RF weld other polymers including nylon, polyethylene terephthalate (PET), ethylene vinyl acetate (EVA) and some acrylonitrile butadiene styrene (ABS) resins, although special conditions may be required. For example, nylon and PET are weldable if preheated welding bars are used in addition to the RF power. RF welding may not be suitable for polytetrafluoroethylene (PTFE), polycarbonate, polystyrene, polyethylene or polypropylene. However, special grades of material such as special grades of polyolefin which do have the capability to be RF welded have been developed and are known to one of skill in the art.

In other embodiments, the seams and seals of the carrier 10 may be sealed together by a double heat seal along the perimeter of the outer shells. In yet other embodiments, the seams and seals of the carrier 10 can be sealed using adhesives known to one of skill in the art.

The seams and seals created must also possess mechanical properties that allow them to withstand stress. Thus, a global stress analysis as well as finite element analysis of joints is beneficial. The durability of the joints must also be assessed.

The carrier 10 is used by inserting an article of bottled liquid or other fragile item into the open insertion end 62 of the compartment 2. The air chambers 3 are then inflated orally through the air valve or manually using a hand pump. This step is necessary prior to closing the dry seal 65 in order to remove air from the compartment 2, allowing the interior layer 30 to conform to the contents. The closure is then formed by rolling the dry seal 65 in the manner already described.

The article or articles is contained within the compartment 2 and secured in place by air pressure in the air chambers 3. The inflation pressure necessary to hold an article or articles in place within the compartment 2 does not need to be extremely high. The carrier 10 is fully functional under various inflation pressures. Use of low to moderate inflation pressures will still stabilize and protect the contents, minimizing space requirements for the user. Even at full inflation, the materials, construction and design permit the carrier 10 to be transported at high altitude where expansion occurs due to the higher pressure differential between the air chambers 3 and compartment 2 and the lower ambient pressure at high altitude.

It will be appreciated that changes may be made from the carrier described above while still enjoying the benefits of the invention herein. For instance, the welds may be of different sizes and shapes, and placed at different locations, the air valve may be placed at various locations, and a varying number of elongated or cylindrical inflatable compartments of selected sizes may be utilized to accommodate articles of varying sizes. Similarly the dimensions, materials and thicknesses of materials can be varied depending upon the desired size and application of the product.

The material of the interior layer may also be varied for different applications. For instance, it may be an exceedingly soft and non-abrasive material for embracing products having exterior finishes that need to be protected during shipment, such as products with finish painting or polishing on their surfaces. The exterior layer may also be varied to enhance properties such as puncture resistance, UV penetration, and insulation.

Accordingly, it will be appreciated that various changes may be made to the carrier without departing from the spirit and scope of the invention. Those skilled in the art will recognize, or be able to ascertain using no more than routine experimentation, many equivalents to the specific embodiments of the invention described herein. Such equivalents are intended to be encompassed by the following claims.

We claim:

1. A carrier, comprising:
an exterior layer and an interior layer, the edges of the exterior layer and the interior layer welded together to form first and second edge seams and at least two inflatable air chambers that at least partially surround a compartment, the air chambers capable of inflation and deflation by means of at least a first valve penetrating the exterior layer at a valve end of the compartment, the valve end comprising a fold in the exterior and interior layers, the compartment able to contain at least one object, the compartment having an insertion end disposed opposite the valve end, the insertion end capable of opening to allow insertion of an object into the compartment, the insertion end having a seal that may be rolled to form a leak-resistant closure that isolates an object within the compartment from the external environment, the seal comprising a first portion and a second portion of the interior layer welded together at at least a first edge and a second edge, the first and second edges disposed on opposite sides of the first and second portions of the interior layer to form an opening in the insertion end between the compartment and the external environment, the seal further comprising a stiffener, the carrier having a transverse distance between the first and second edge seams on a line perpendicular to the first and second edge seams at a distance midway between the valve end and the insertion end, the carrier further comprising first, second, third, and fourth vertical stability bar welds between the exterior layer and interior layer, each vertical stability bar weld substantially parallel to the first and second edge seams and substantially perpendicular to the valve end, the first vertical stability bar weld disposed one-third the transverse distance from the first edge seam and one-third the transverse distance from the second vertical stability bar weld, the third vertical stability bar weld disposed one-third the transverse distance from the first edge seam and one-third the transverse distance from the fourth vertical stability bar weld, the second vertical stability bar weld disposed one-third the transverse distance from the second edge seam and one-third the transverse distance from the first vertical stability bar weld, the fourth vertical stability bar weld disposed one-third the transverse distance from the second edge seam and one-third the transverse distance from the third vertical stability bar weld.

* * * * *